United States Patent
Pesnel

(10) Patent No.: US 7,438,281 B2
(45) Date of Patent: Oct. 21, 2008

(54) PULLEY FOR ASSISTING IN THE TAKE-UP OR DEPLOYMENT OF A HETEROGENEOUS SYSTEM

(75) Inventor: Florent Pesnel, Montauban de luchon (FR)

(73) Assignee: Sercel (FR)

( * ) Notice: Subject to any disclaimer, the term of this patent is extended or adjusted under 35 U.S.C. 154(b) by 0 days.

(21) Appl. No.: 11/772,856

(22) Filed: Jul. 3, 2007

(65) Prior Publication Data

US 2008/0006802 A1  Jan. 10, 2008

(30) Foreign Application Priority Data

Jul. 7, 2006  (FR) .................................. 06 06229

(51) Int. Cl.
B66D 3/08 (2006.01)
(52) U.S. Cl. ........................................ 254/393; 254/395
(58) Field of Classification Search ................ 254/393, 254/394, 395, 396, 404, 407, 408
See application file for complete search history.

(56) References Cited

U.S. PATENT DOCUMENTS 4,192,393 A * 3/1980 Womack et al. ............. 175/103
5,200,581 A * 4/1993 Boyle et al. ................. 181/102
5,489,254 A * 2/1996 Lob ............................ 384/454
6,775,204 B2 * 8/2004 Scott .......................... 367/17

FOREIGN PATENT DOCUMENTS

| EP | 1385022 A1 | 1/2004 |
| FR | 2293355 | 7/1976 |
| FR | 2572048 | 4/1986 |

OTHER PUBLICATIONS

"French and International Search Reports", Feb. 14, 2007, 2 pp.

* cited by examiner

Primary Examiner—Emmanuel M Marcelo
(74) Attorney, Agent, or Firm—Pauly, DeVries Smith & Deffner, L.L.C.

(57) ABSTRACT

A pulley for assisting in the deployment or take-up of a heterogeneous system including modules configured to be placed or being placed in an environment. These modules are connected via connecting members and the pulley is configured to be mounted rotatably on a shaft placed above the environment. The pulley includes first cooperating members configured to cooperate with the connecting members and second cooperating members configured to cooperate with the modules. The first and second cooperating members are configured to produce two successive operating states, namely, a first state during which the pulley is substantially stationary in rotation around the shaft and a second state corresponding to the passage of the modules, during which the pulley is driven in rotation around the shaft.

17 Claims, 5 Drawing Sheets

PULLEY FOR ASSISTING IN THE TAKE-UP OR DEPLOYMENT OF A HETEROGENEOUS SYSTEM

RELATED APPLICATIONS

This application claims priority to French Patent Application No. FR 06/06229, filed on Jul. 7, 2006, which is hereby incorporated by reference in its entirety.

FIELD OF THE INVENTION

The field of the invention is materials-handling equipment. More precisely, the invention relates to a device for assisting in the take-up or deployment of a heterogeneous system including modules joined together by connecting members.

BACKGROUND OF THE INVENTION

A device according to the invention is intended to provide assistance in the placement of modules in an environment, the latter possibly being a cavity such as a well, or else an aquatic environment such as the ocean. One particular application of the invention relates to borehole wells. During the course of drilling or exploiting borehole wells, it is generally sought to model the environment around the well, this being done by the geophysical surveying thereof.

In order to do this, seismic probes (constituting modules) are lowered into the well at various successive depths. These probes are conventionally in the form of tubular elements and are equipped with measuring instrumentation intended for studying the geological formations encountered or for carrying out seismic prospecting. These probes are joined together by an electromechanical cable including electrical distribution lines for the instrumentation and signal transmission lines. For informational purposes, the tubular elements commonly have a length of approximately 0.6 meters (and can reach 1.7 m for the largest modules) and the cables have a length of approximately 15 m.

The assembly formed by the cables and the probes is, for example, a "VSP" (Vertical Seismic Profile) chain or any other chain of seismic acquisition modules, and constitutes a heterogeneous system within the meaning of the invention. In other words, a system such as this is designated as heterogeneous in the sense that it consists of components of different shapes and dimensions (e.g., the probes, rigid lengthwise, and the cables, flexible and having a small cross-sectional area in comparison with the probes), involving guide members for their take-up/deployment, which are customized to each component.

Currently, the probes are lowered one-by-one into the borehole wells, their connection to the cables being carried out as the VSP chain descends. Of course, the operations for assembling the probes together with the cables require considerable holding time and, furthermore, are carried out on site under conditions that may in practice be non-optimal (in particular due to the overall dimensions of the worksite, climatic conditions, etc.). Furthermore, mechanical testing of the assembly is itself carried out as the VSP descends, this testing generally being ensured by the persons having been engaged in the assembly. Of course, this self-testing is carried out with the greatest of care. But, the personnel in charge of these operations is also subjected to productivity considerations, motivating them to work at a steady pace, which can be a source of errors and therefore malfunctions.

Such being the case, it is observed that, in practice, once the chain is in place, a break in the transmission of data is often detected, rendering the chain overall inoperable. This can be due to the failure of one of the components of the chain/or to the faulty connection of one of the components with the cables. This failure can be localized at the level of the first components lowered into the well, and is only detected once the complete chain has been installed. It may then be necessary to pull the chain out completely in order to perform checks, and to then re-install the chain once the detected defects have been corrected.

Furthermore, current VSP chains include a relatively limited number of probes, between 2 and 32. As far as the chains with 32 probes are concerned, they can have a length of several hundred meters, which involves considerable installation (or removal) time. Such being the case, chains capable of comprising up to 100 levels have recently been proposed.

It is understood that the time for placing the VSP chains inside the wells (as well as that for removing them from the well) will be substantially increased due to the increase in the number of probes and operations for connecting them to the cables. It is further noted that the increase in the number of probes in the VSP chains tends to weigh down the storage and/or transport logistics for the various components of the chain.

There is a need for improved material handling arrangements, and particularly there is a need for material handling equipment that addresses the disadvantages of existing systems.

SUMMARY OF THE INVENTION

One aspect of the invention relates to a pulley for assisting in the deployment or take-up of a heterogeneous system including modules configured to be placed or being placed in an environment. These modules are connected via connecting members and the pulley is configured to be mounted rotatably on a shaft placed above the environment. The pulley includes first cooperating members configured to cooperate with the connecting members and second cooperating members configured to cooperate with the modules. The first and second cooperating members are configured to produce two successive operating states, namely, a first state during which the pulley is substantially stationary in rotation around the shaft and a second state corresponding to the passage of the modules, during which the pulley is driven in rotation around the shaft.

Another aspect of the invention relates to a device for assisting in the deployment/up-take of a heterogeneous system. The device includes modules configured to be placed or being placed in an environment, where these modules are connected by connecting members. The device further includes at least one deflecting pulley mounted rotatably on a shaft placed above the environment and over which the heterogeneous system travels. The pulley includes first cooperating members configured to cooperate with the connecting members and second cooperating members configured to cooperate with the modules, the first and second cooperating members being designed so as to produce two successive operating states. These are a first state during which said pulley is substantially stationary in rotation around the shaft, and a second state corresponding to the passage of the modules, during which the pulley is driven in rotation around the shaft.

The invention may be more completely understood by considering the detailed description of various embodiments of the invention that follows in connection with the accompanying drawings.

Figure 1:
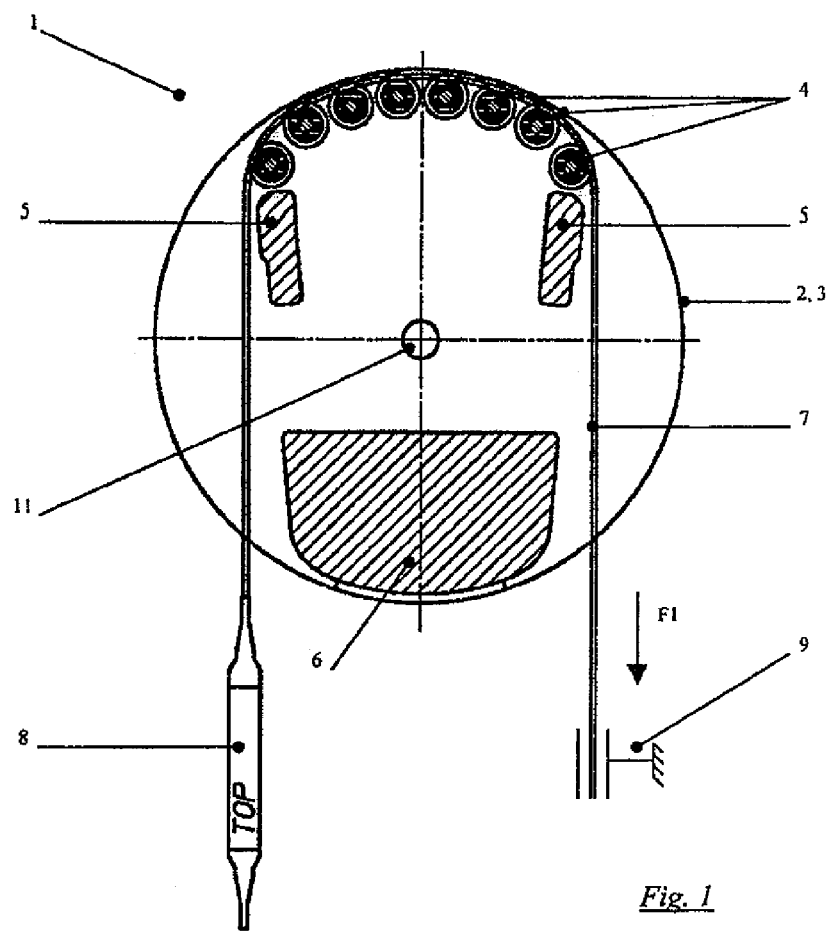
FIG. 1 is a schematic representation of a device according to the invention.

While the invention may be modified in many ways, specifics have been shown by way of example in the drawings and will be described in detail. It should be understood, however, that the intention is not to limit the invention to the particular embodiments described. On the contrary, the intention is to cover all modifications, equivalents, and alternatives following within the scope and spirit of the invention as defined by the claims.

DETAILED DESCRIPTION OF THE INVENTION

The invention relates to a technique for deploying or taking up heterogeneous systems in a manner that makes it possible to realize considerable savings in time in comparison with the solutions of the prior art. The invention also makes it possible to obtain gains in terms of the reliability of the connections of the modules with the connecting members. The invention also improves the control of the assembly of the heterogeneous system components and facilitates the transport of the heterogeneous system components.

The invention further relates to a pulley for assisting in the deployment/take-up of a heterogeneous system including modules intended to be placed or being placed in an environment, where the modules are connected via connecting members, the pulley being intended to be mounted rotatably on a shaft placed above the environment, and being characterized in that the pulley includes first cooperating members intended to cooperate with the connecting members and second cooperating members intended to cooperate with the modules. The first and second cooperating members are designed so as to produce two successive operating states; namely, a first state, during which said pulley is substantially stationary in rotation around said shaft, and a second state corresponding to the passage of said modules, during which said pulley is driven in rotation around said shaft.

Thus, owing to the invention, it is possible to carry out the placement of a heterogeneous system, the modules and connecting members of which are pre-connected. The operation of the pulley, which will subsequently be explained in more detail, enables the passage of structurally very different components over the pulley, such as probes and the cables of a VSP chain, or systems making it possible to study the bottom of the oceans (such as OBC (Ocean Bottom Cable) chains), which would not be the case with a conventional pulley. As a matter of fact, traditional pulleys do not enable the passage of heterogeneous systems consisting of modules joined together via connecting members. There are several reasons for this. First, in some applications, the modules consist of a longilineal body capable of working in traction; the passage of such modules over traditional pulleys would tend to subject the modules to bending stresses, which could result in degradation of the components built into the body of the module. Second, with the running of a traditional pulley, the cables would form a relatively sharp angle with the modules (unless pulleys of very large dimensions are anticipated), which would impose relatively significant stresses where the cables are anchored to the modules, at the risk of damaging these anchors. A pulley constructed according to the invention prevents these phenomena.

Being able to work with pre-connected heterogeneous systems has numerous advantages. One advantage is a significant decrease in the on-site holding times by eliminating the time for assembling the modules with the cables at the time of installing the heterogeneous system. Another advantage is that the assembly of the modules and the connecting members can be carried out under workshop conditions that are better suited to precision and/or control operations than on site conditions (the latter being subjected to climatic conditions, and possibly being crowded or even uncomfortable). Furthermore, pre-assembly leads to the possibility of double-checking (and therefore increased reliability of the assembled heterogeneous system), including a first off-site check making it possible to verify proper functioning (transmission of electronic data and/or seismic acquisitions) of the overall chain and a second on-site check during lowering of the heterogeneous system. Further yet, improvements are realized in material logistics owing to the storage and transport of the heterogeneous system being carried out in the assembled state and not with separate components.

In one aspect of the invention, the pulley includes two flanges having a clearance between them making it possible to successively form a passageway for the connecting members and to at least partially house the modules. In this way, a housing is formed for the modules at the time they pass over the pulley, which, on the one hand, makes it possible to effectively ensure their guiding and, on the other hand, to confine them between the flanges, thereby preventing possible interferences with surrounding structural elements, or even with persons in proximity to the device.

The first cooperating members advantageously include support members for the connecting members, which are movable and intended to be driven by the connecting members, the first cooperating members preferably including a roll-way. In this way, a simple and effective means is obtained for conveying the connecting members over the pulley without bringing about the rotation of the latter around its shaft.

According to one advantageous embodiment, said first cooperating members include a series of rollers. In this way, the first cooperating members are made according to a design that is simple and inexpensive to produce. In this case, the rollers preferably have a substantially identical diameter between them and are mounted on shafts which, when viewed as a profile, define an arc of circle between them. The curvature of the connecting members during their passage over the pulley is thereby promoted, this being done while preventing the formation of too large of an angle at the ends of the roll-way.

It is noted that the curvature of the running surface can be obtained with a different arrangement, according to other foreseeable embodiments, e.g., by modifying their diameter and/or by staggering them in relation to each other. It is also noted that an endless tread can be added on to or around the rollers. Because of this, the connecting members, by reason of their flexibility, conform to the arc of circle shape defined by the running surface of the rollers and continue to bear against them. The shafts of the rollers are advantageously held by the flanges. In this way, a compact, simple in design and easy to mount assembly is obtained.

According to another aspect, the second cooperating members include at least one drive member against which said modules are intended to come to bear. In this case, according to a first embodiment, the drive member includes at least one stop-motion device mounted between the flanges and positioned on the path of the modules during the take-up/deployment of the heterogeneous system. According to a second embodiment, the flanges have an area where they fold down towards each other so as to form the drive member. An arrangement according to either of these embodiments proves to be particularly simple and mechanically efficient. As will subsequently be explained in more detail, the passage of the modules between the flanges involves cooperation with the corresponding drive member and, as a result of the movement of the heterogeneous system, the driving in rotation of the pulley, this being done without risking any malfunction of the pulley.

The pulley advantageously includes two drive members, one corresponding to the deployment of the heterogeneous system, the other corresponding to the take-up of the heterogeneous system. It is clearly understood that a pulley made in this way, according to the invention, is intended both for the deployment as well as for the take-up of a heterogeneous system.

In one embodiment, the pulley includes return members tending to bring the pulley from the second state to the first state. In this way, the pulley can automatically pass from one operating state to the other, this being done concurrently with the transport of the heterogeneous system. In this case, the return members preferably include at least one counterweight positioned diametrically opposite the first cooperating members, in relation to the shaft of the pulley. Thus, the return of the pulley into its position corresponding to the passage of the connecting members is easily obtained using simple to implement means, this being accomplished via a tilting movement produced by the counterweight. It is noted that the return of the pulley can generally be obtained by any system making it possible to move the centre of gravity of the pulley off centre in relation to its axis of rotation.

The return members preferably include means for temporarily cooperating with the connecting members. In this way, a support is formed on which the modules rest as the pulley is rotating, this being accomplished by giving the modules a predetermined orientation.

The invention also relates to a device for assisting in the deployment or up-take of a heterogeneous system including modules intended to be placed or being placed in an environment, the modules being connected by connecting members, the device including at least one deflecting pulley mounted rotatably on a shaft placed above the environment and over which the heterogeneous system travels. In such a device, the pulley includes first cooperating members intended to cooperate with the connecting members and second cooperating members intended to cooperate with the modules, the first and second cooperating members being designed so as to produce two successive operating states. In a first state, the pulley is substantially stationary in rotation around said shaft. A second state corresponds to the passage of the modules, during which the pulley is driven in rotation around the shaft.

According to an embodiment, the device includes means for taking up the weight of the heterogeneous system, which are external to the pulley. As indicated previously in reference to VSP chains, heterogeneous systems can reach considerable lengths and, as a result, a considerable weight (approximately 2 tons). A characteristic of the device such as this thus makes it possible to significantly reduce the mechanical stresses that are exerted on the pulley due to the weight of the heterogeneous system.

As indicated previously, the principle of the invention is based on the fact of designing a pulley in such a way that it is stationary in rotation during the passage of connecting members of a heterogeneous system, and driven in rotation by the passage of modules of the heterogeneous system. In this way, the connecting members travel over the pulley while it is stationary, the latter temporarily conforming to the shape of the pulley, while the rigid modules rotate around the shaft of the pulley while carrying the pulley along with them. In order to accomplish this, the pulley includes first cooperating members intended to cooperate with the connecting members and second cooperating members intended to cooperate with the modules.

An embodiment of the invention is shown in FIG. 1. The device of FIG. 1 includes a pulley 1 mounted rotatably around a shaft 11, and includes two flanges 2, 3 having a circular shape and separated from one another in such a way that they form a space between them inside of which the heterogeneous system can travel. The device of FIG. 1 further includes support members for the connecting members, consisting of a series of rollers 4 mounted freely rotatable. Two drive members form stop-motion devices 5 mounted between the flanges 2, 3 and against which the modules are intended to come to bear, whereby the movement of the modules drives the pulley in rotation around its shaft.

The clearance between the flanges 2, 3 and the diameter of the latter are provided on the basis of the dimensions and shapes of the modules, this being done so that the modules can be completely housed between the flanges when the modules pass over the pulley. Furthermore, the rollers 4 are each mounted on a shaft supported by the flanges 2, 3. In addition, as shown in FIG. 1, the rollers 4 all have the same diameter and define a curved roll-way that is substantially parallel to the portion of the perimeter of the flanges in the vicinity of which they are mounted. According to another characteristic of the device, a counterweight 6 is mounted between the flanges 2, 3 in a position which, in relation to the shaft 11, is diametrically opposite that of the roll-way defined by the rollers.

The operation of the device that has just been described is explained more fully with reference to FIGS. 1 to 5. The remainder of the description is made with reference to the application of a device according to the invention to a borehole well in line with which the pulley 1 is mounted. In this context, the heterogeneous system that one is attempting to deploy/take up is a chain of seismic acquisition modules such as a VSP chain, in which the modules are seismic probes and the connecting members are electric and signal transmission cables. It is recalled that a device according to the invention can be intended for other heterogeneous systems and/or for their deployment/take-up in environments other than borehole wells. For example, a device according to the invention can be used for lowering modules to the bottom of an ocean.

For informational purposes, a pulley of a device according to the invention intended for the deployment/take-up of a VSP chain has an outside diameter of approximately 1.40 m. Starting from an initial state such as the one shown in FIG. 1, the cable 7 is passed around the pulley 1, the latter having rollers 4 at its upper portion and the cable resting on the rollers 4. By exerting a tractive force (as symbolised by the arrow F1) on the cable, the latter runs over the rollers, which roll on themselves (the rollers being mounted freely rotatable). During this phase, the pulley remains stationary in rotation around its shaft (or almost, slight oscillating movements of the pulley possibly occurring, due, for example, to the fouling of the rollers on their shaft, this possibly causing a resistance capable of transmitting a slight torque to the flanges of the pulley.) This first phase continues until a probe 8 enters into the space between the flanges 2, 3 of the pulley and comes into contact with a stop-motion device 5 (appropriately positioned on the path of the probe). It is noted that the shape of the stop-motion devices 5 is designed so as to partially match the shape of the end of the probe with which the stop-motion device is intended to cooperate.

Figure 2:
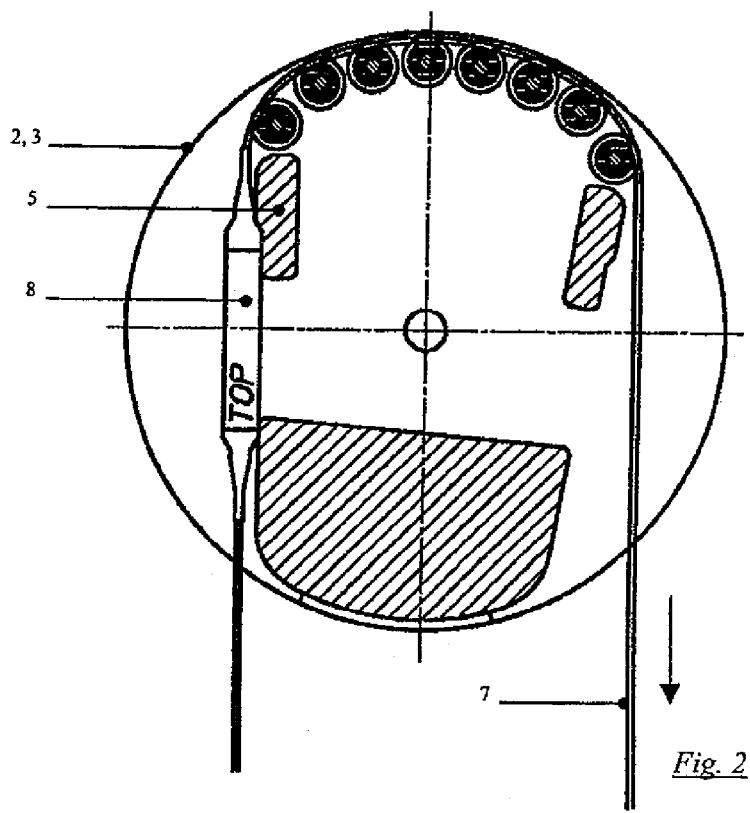
FIGS. 2 to 5 are schematic representations of a device according to the invention, showing successive operating phases.
Figure 3:
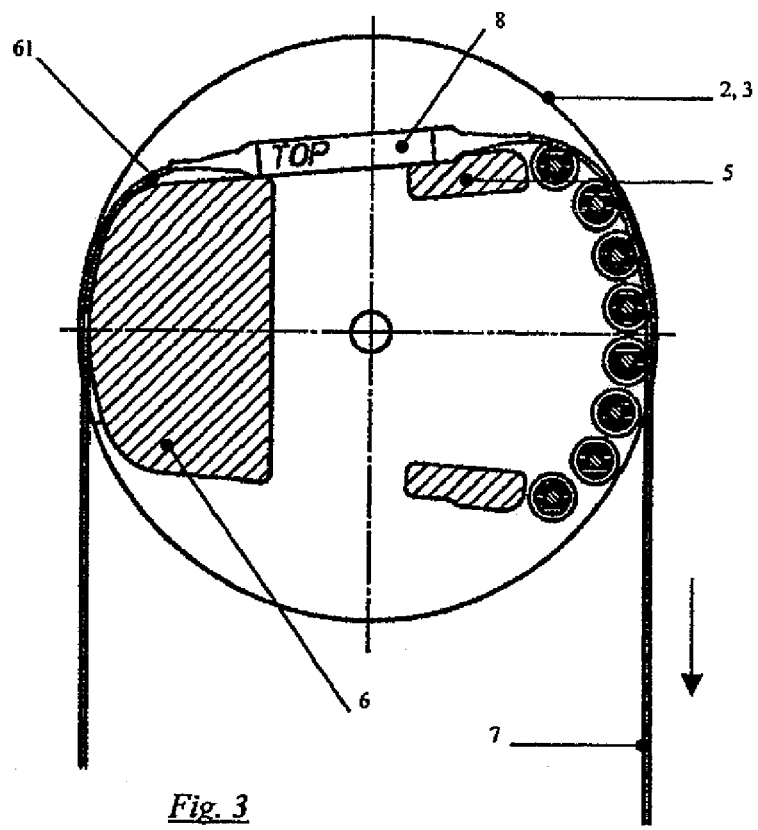
Figure 4:
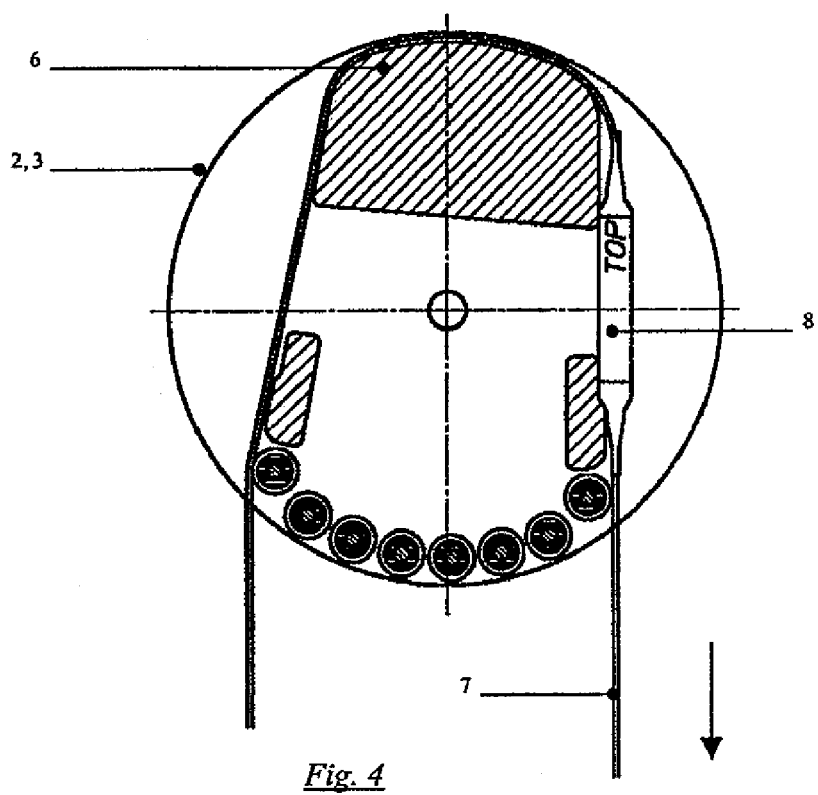
Figure 5:
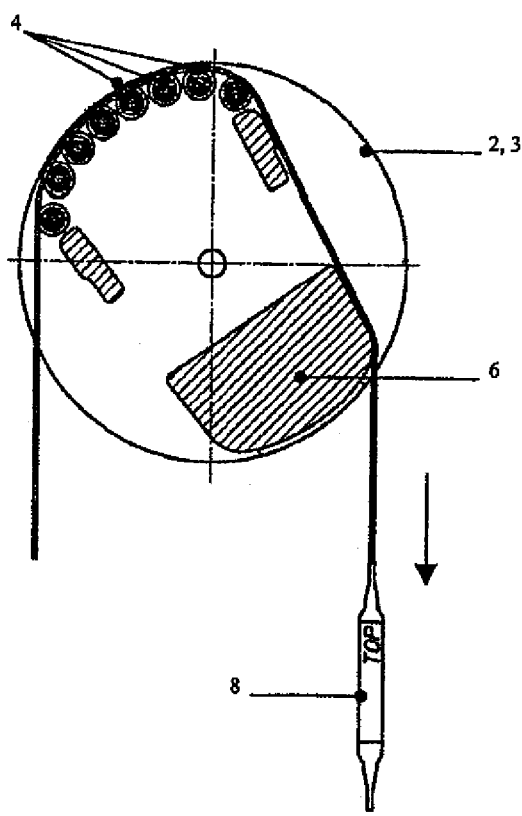

When a probe 8 is in contact with a stop-motion device 5, and while continuing to exert the tractive force on the cable 7, the probe exerts a thrust force on the corresponding stop-motion device 5 and brings about the rotation of the pulley, as shown in FIGS. 2 to 4, which show successive steps of rotation of the pulley. As seen clearly in FIG. 3, the probe 8 extends between the stop-motion devices 5 and the edge 61 of the counterweight 6 (both in line with one another), one end of the probe resting on the edge 61 of the counterweight while its other end rests on the stop-motion device 5. In this way, the rear end of the probe (in its direction of movement) is prevented from tilting towards the shaft of the girder. The rotation of the pulley continues up to approximately 180° (FIG. 4) from the initial position, the probe being gradually brought into a position in which it is released from the space between the flanges 2, 3 of the pulley.

The release of the probe is intended to be carried out after a rotation of the pulley slightly greater than 180° in relation to its initial position, which brings the counterweight (then at the upper portion of the pulley) into a position having passed beyond the unstable equilibrium position of the pulley. Correspondingly, when the probe is completely released from the pulley, the counterweight, due to the effect of gravity, tilts towards a stable equilibrium position corresponding to FIG. 1, and therefore tends to bring the pulley back into a position corresponding to the initial step. During this return phase, the rollers 4 roll against the cable 7, which, during this phase, can be held fixedly or be driven itself.

The kinematics just described corresponds to the deployment of a VSP chain. The drive device is adapted to the take-up of the chain via the presence of a second stop-motion device 5, which cooperates with the probes when the latter are brought back up from the wells (the running direction of the chain and the rotation of the pulley being reversed, of course, in comparison with the operation that was just described). Furthermore, a portage system 9 for the VSP chain can be provided in parallel with the pulley in order to sequentially take up the weight of the VSP chain lowered into the well. Such a system, designated by the term "clamp," is substantially in the form of two jaws closing down under the module and defining a housing for the latter, in order to support the weight of the chain.

Figure 6:
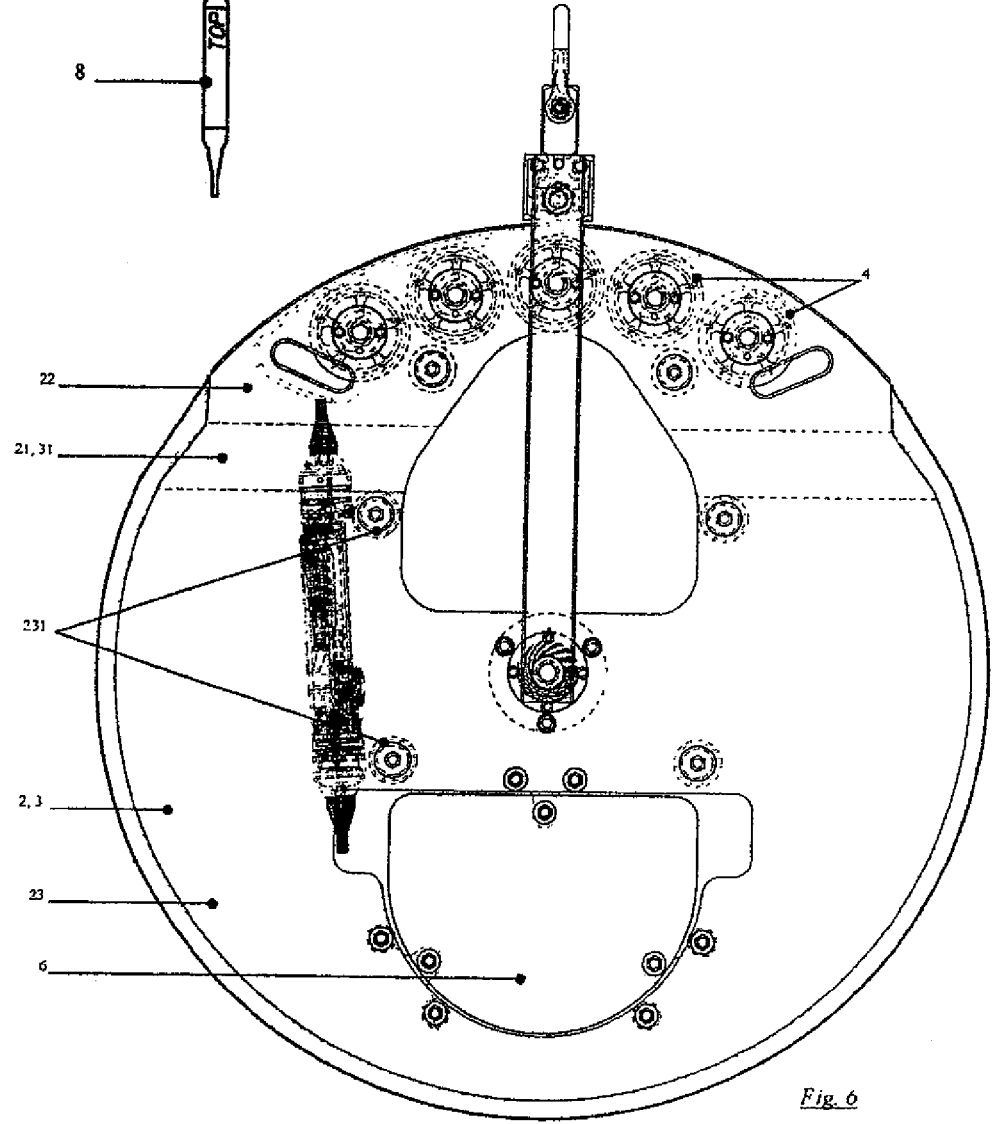
FIGS. 6 and 7 are views of a preferred embodiment of the invention, as seen from a profile and front view, respectively.
Figure 7:
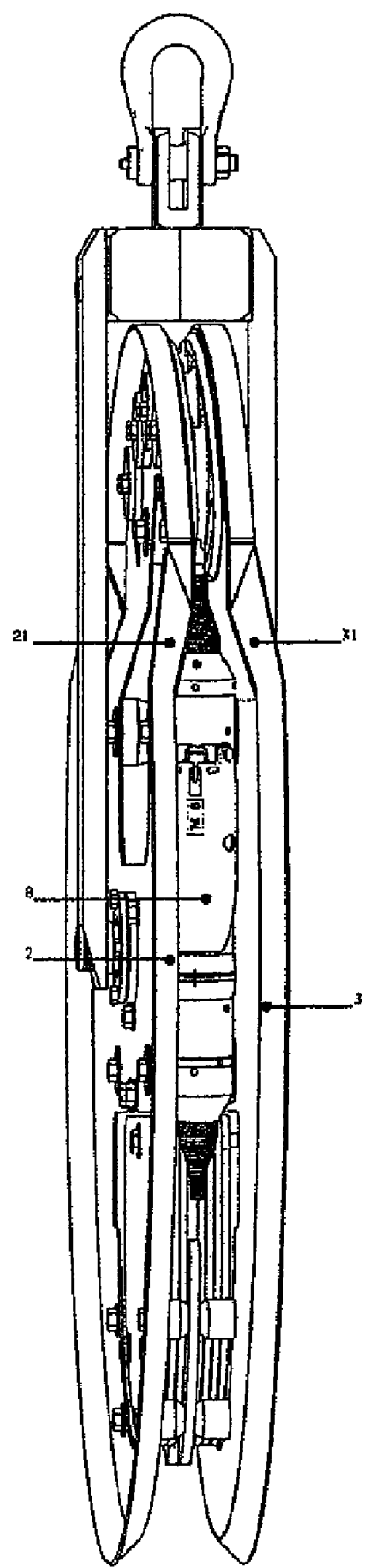
Figure 8:
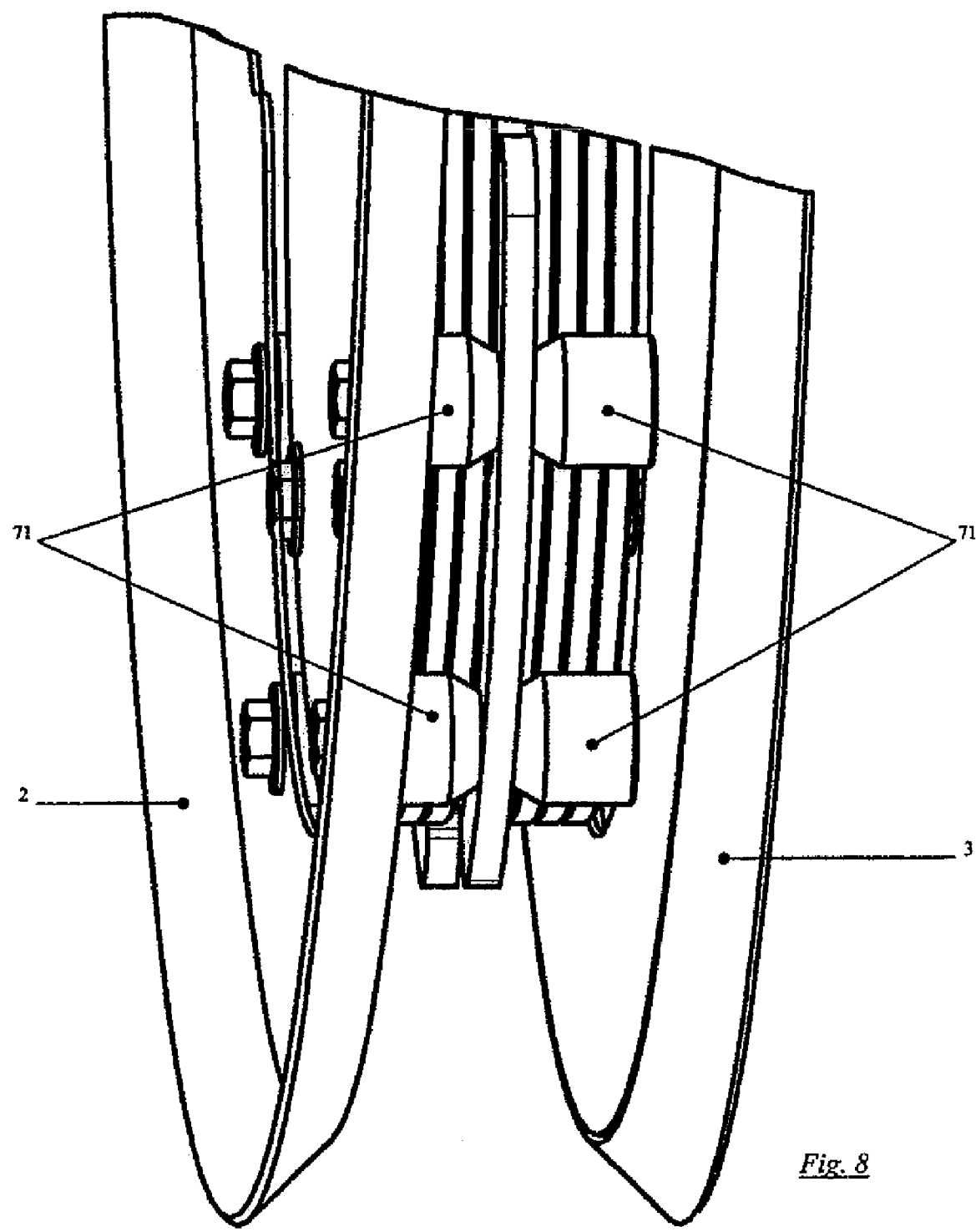
FIG. 8 is a partial view of a pulley according to a preferred embodiment of the invention, showing means for temporarily cooperating with the connecting members.

As seen in FIGS. 6 to 8, the pulley includes two flanges 2, 3 made, for example, by the drawing of a metal sheet. In the position shown in FIG. 6, the pulley has a series of rollers 4 at its upper portion, and a counterweight 6 at its lower portion. According to this embodiment, the flanges 2, 3 each have a folded-down area, 21, 31, respectively, so as to form three spaces between them. These are space 22 in which the flanges 2, 3 have a clearance between them corresponding approximately to the diameter of the connecting members, the rollers 4 forming a roll-way being included in this space; an area 21, 31 forming means for driving the pulley via the modules, the narrowing formed by the folding down of the flanges towards each other forming a stop-motion device against which the end of the modules comes to bear; and a space 23 in which the flanges 2, 3 have a clearance between them corresponding approximately to the diameter of the modules. It is noted that the members 231, being, for example, in the form of bobbins, are mounted between the flanges 2, 3 in the space 23, these members 231 being intended to form supports for the modules (probes) 8, which can thereby rest on the members 231 during rotation of the pulley (this constituting a preferred embodiment in comparison with the schematic diagram of FIG. 3, according to which the probe rests on an edge of the counterweight).

Furthermore, in reference to FIG. 8, the pulley also includes means 71 for temporarily cooperating with the connecting members (cables) 7. These means 71 include two pairs of studs having a truncated cone-shaped end portion. The shape of the studs and the distance between them are provided so as to produce a slight pinching of the cables when the latter are situated between the studs. This temporary cooperation occurs, in particular, when the pulley occupies a position such as the one shown in FIG. 4. As a matter of fact, in this position, it is preferable to orient the direction of rotation of the pulley during the return of the pulley to the first state (corresponding to the position of the pulley shown in FIG. 1), this being done in order to avoid the risk that, under the effect of the counterweight, the pulley might tilt in a direction opposite the travel of the heterogeneous system. Thus, owing to the temporary cooperation means 71, the cable, which is driven by a system external to the pulley, tends to drive the pulley in the direction of travel of the heterogeneous system, due to the pinching of the connecting members between these means 71.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The above specification provides a complete description of the structure and use of the invention. Since many of the embodiments of the invention can be made without parting from the spirit and scope of the invention, the invention resides in the claims.

What is claimed is:

1. A pulley for assisting in the deployment or take-up of a heterogeneous system including modules configured to be placed or being placed in an environment, said modules being connected via connecting members, said pulley configured to be mounted rotatably on a shaft placed above said environment, the pulley comprising:
   (i) first cooperating members configured to cooperate with said connecting members; and
   (ii) second cooperating members configured to cooperate with said modules; where
   (iii) said first and second cooperating members are configured to produce two successive operating states:
       (a) a first state, during which said pulley is substantially stationary in rotation around said shaft; and
       (b) a second state corresponding to the passage of said modules, during which said pulley is driven in rotation around said shaft.

2. The pulley of claim 1, comprising two flanges having a clearance between them making it possible to successively form a passageway for said connecting members and to at least partially house said modules.

3. The pulley of claim 2, where said first cooperating members includes support members for said connecting members, which are movable and configured to be driven by said connecting members.

4. The pulley of claim 3, where said first cooperating members forms a roll-way.

5. The pulley of claim 4, where said first cooperating members includes a series of rollers.

6. The pulley of claim 5, characterized in that said rollers have a substantially identical diameter between them and are mounted on shafts defining an arc of circle, when seen as a profile view.

7. The pulley of claim 6, characterized in that said shafts of said rollers are held by said flanges.

8. The pulley of claim 7, characterized in that said second cooperating members include at least one drive member against which said modules are configured to come to bear.

9. The pulley of claim 8, characterized in that said drive members include at least one stop-motion device mounted between said flanges and positioned on the path of said modules during the take-up/deployment of said heterogeneous system.

10. The pulley of claim 8, characterized in that said flanges have an area where they fold down towards each other so as to form said drive member.

11. The pulley of claim 10, characterized in that it includes two drive members, one corresponding to the deployment of the heterogeneous system, the other corresponding to the take-up of the heterogeneous system.

12. The pulley of claim 11, characterized in that it includes return members tending to bring said pulley of from said second state to said first state.

13. The pulley of claim 12, characterized in that said return members include at least one counterweight positioned diametrically opposite said first cooperating members, in relation to said shaft of said pulley.

14. The pulley of claim 13, characterized in that said return members include means for temporarily cooperating with said connecting members.

15. The pulley of claim 14, characterized in that it includes support members against which said modules are configured to extend in said second state.

16. A device for assisting in the deployment/up-take of a heterogeneous system comprising:
   (i) modules configured to be placed or being placed in an environment, said modules being connected by connecting members;
   (ii) at least one deflecting pulley mounted rotatably on a shaft placed above said environment and over which said heterogeneous system travels; and
   (iii) wherein said pulley includes first cooperating members configured to cooperate with said connecting members and second cooperating members configured to cooperate with said modules, said first and second cooperating members being designed so as to produce two successive operating states:
      (a) a first state, during which said pulley is substantially stationary in rotation around said shaft; and
      (b) a second state corresponding to the passage of said modules, during which said pulley is driven in rotation around said shaft.

17. The device of claim 16, characterized in that it includes means for taking up the weight of the heterogeneous system, which are external to said pulley.

* * * * *